Sept. 24, 1946.  F. H. FODOR  2,408,163
LANDING WHEEL DRIVE
Filed Jan. 30, 1945
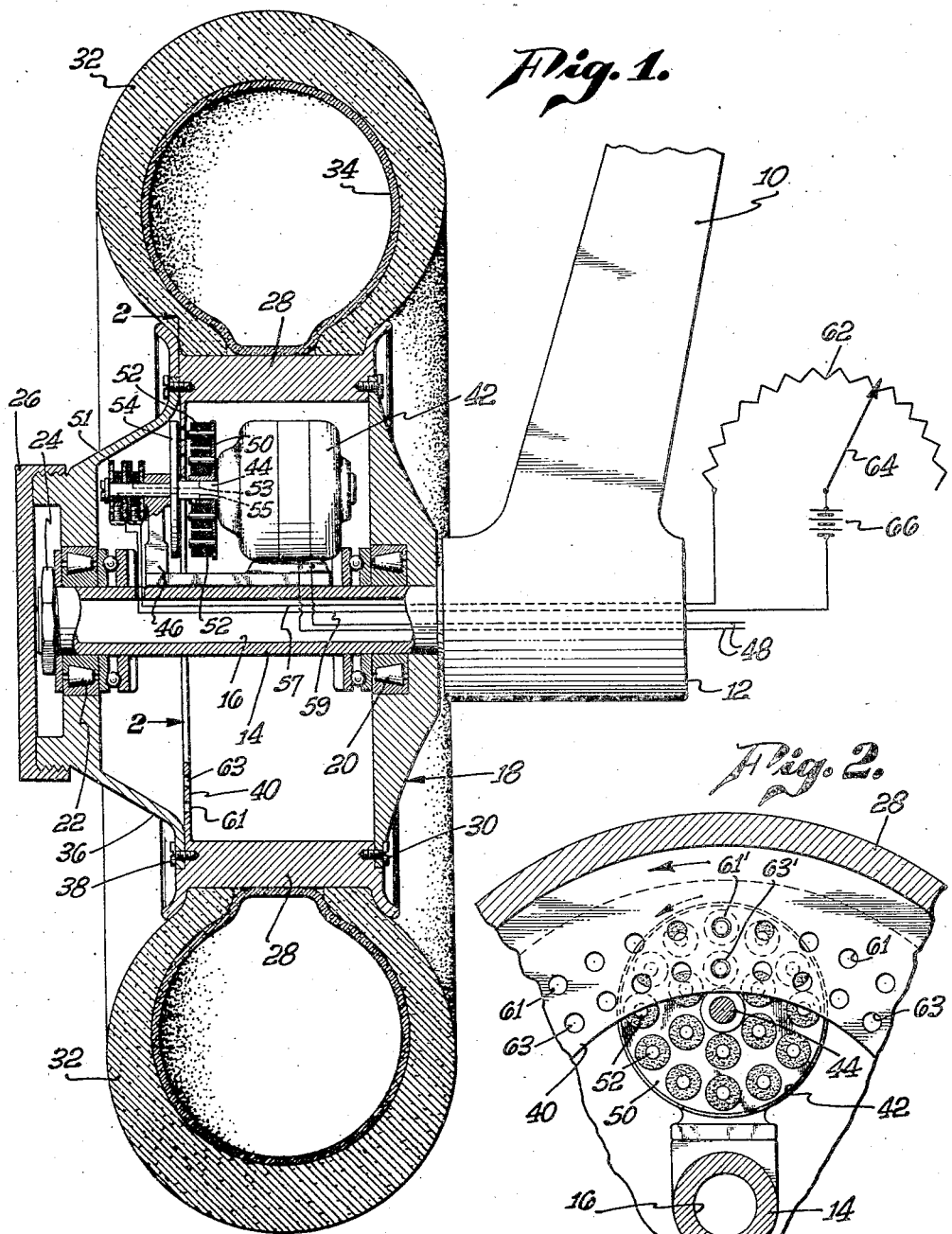
INVENTOR.
FERENZ FODOR,
BY
ATTORNEY.

Patented Sept. 24, 1946

2,408,163

UNITED STATES PATENT OFFICE 2,408,163

LANDING WHEEL DRIVE

Ferenz H. Fodor, Los Angeles, Calif., assignor to Technical Securities Corporation, Los Angeles, Calif., a corporation of Delaware Application January 30, 1945, Serial No. 575,227

8 Claims. (Cl. 244—103)

My invention relates to airplanes and particularly to a device for rotating the landing wheels of a descending plane before the plane comes to rest on the ground, the device being so constructed that it can act as a brake on the wheels after the wheels begin rolling over the ground.

Among the objects of my invention is to provide a new and improved drive for airplane landing wheels for the purpose of rotating the wheels before landing by means of a drive having such a character that it will not be damaged by nor interfere with rotation of the wheels after they hit the ground in the event that the speed of the plane relative to the ground should be different from the speed at which the wheels are rotating.

Another object of my invention is to provide a slip drive for airplane landing wheels which can be given a speed corresponding to the plane when landing.

Still another object of my invention is to provide a slip drive for airplane landing wheels which can be used as a brake upon the wheels after the wheels have begun rolling along the ground.

A further object of my invention is to provide a new and improved structure which will replace the conventional brake heretofore used upon airplane landing wheels.

A still further object is to provide a combined electrical drive and brake for airplane landing wheels, the effect of which can be varied by remote control in order to coincide either with the ground speed or with the rate at which it is desired to stop the plane once on the ground.

With these and other objects in view, my invention consists in the construction, arrangement and combination of the various parts of my device whereby the objects contemplated are attained, as hereinafter more fully set forth, pointed out in my claims and illustrated in the accompanying drawing, in which:

Fig. 1 is a cross-sectional view of a wheel and mounting.

Fig. 2 is a partial side view in section taken on the line 2—2 of Fig. 1 showing details of the slip drive.

It is common knowledge that when aircraft land on the ground they land at a considerable speed and that the wheels on the landing gear which are ordinarily not rotating must suddenly accelerate their rotation to coincide with the landing speed of the plane. Sudden acceleration of this kind causes considerable strain on the wheel and particularly on the rubber tire. Rubber is likely to be badly worn and wasted. In fact the acceleration has been found to be so great in some instances that it has been necessary to resort to valveless inner tubes for the tires due to the fact that in some instances valves have actually been ripped out because of the tire slipping on the rim of the wheel.

Much of this difficulty can be avoided if the aircraft wheel is rotated up to speed before the plane hits the ground. Since while the plane is traveling in the air there is no resistance other than friction to rotation of the wheel only a small amount of power is necessary to rotate the wheel as fast as may be desired.

By reason also of the fact that weight in an aircraft is at a premium, it is highly desirable to be able to utilize the power means for initially rotating the wheels and then as a brake device after landing so that the apparatus may serve two purposes.

In the embodiment of my device chosen to illustrate the invention there has been shown a landing wheel strut 10 which ordinarily extends below a plane when it is landing. At the lower end of the strut is a block 12 from one side of which extends a wheel axle 14. A passage 16 extends through the axle and block. A disc wheel 18 is shown mounted upon the axle by means of sets of conventional bearings 20 and 22. A nut 24 is applied to the outside end of the axle to hold the wheel in plane and a hub cap 26 is applied by means of a threaded connection to the outside center of the disc wheel.

The wheel is provided with a demountable rim 28 bolted to the disc wheel by means of bolts 30 and a tire 32 and inner tube 34 of the usual sort is mounted upon the rim. A face plate 36 is fastened to the rim by means of bolts 38 providing a large hollow enclosed space within the rim and face plate.

An annular flange 40 extends inwardly from the outside edge of the rim at a point adjacent the face plate. The entire wheel structure and particularly the flange are customarily made of cast aluminum.

In a design of this kind the axle remains stationary relative to the wheel strut. Mounted upon the axle 14 is a constant speed motor 42 which has its shaft 44 positioned in parallel relationship with the axle and spaced therefrom. A bearing support 46 is likewise mounted stationary upon the axle and supports the motor shaft. Electric connections 48 extend from the motor to a source of electric power within the plane. Mounted upon the motor shaft is a disc 50 of malleable iron which has extending from it an arrangement of cores 52 which are wound in series with conductor wire. It will be noted that the cores are arranged in two concentric circles about the motor.

A conventional set of slip rings 51 is provided mounted on the shaft of the motor for connecting wires 53, 55 from the cores to a pair of leads 57, 59.

A second disc 54 also of malleable iron is mounted upon the motor shaft in a plane parallel to the first disc and spaced from the ends of the cores 52. It will be noted that the flange 40 of the wheel extends into the space between the disc 54 and the ends of the cores leaving a slight amount of space between the surface of the flange and the malleable disc on one side and between the surface of the flange and the core ends on the other side. It has been found in practice that a satisfactory dimension for the space in each case is of the magnitude of .2" for a flange thickness of .4". It should also be noted that on the flange there are concentric rows of perforations 61 and 63 which coincide in position with the ends of the cores 52 when the flange extends in the space between the disc 54 and the cores. The coinciding position is best shown in Fig. 2 at the points 61' and 63'. Adjacent perforations evidence a partial coinciding.

In order to complete the circuit through the core windings there is provided an electric resistance 62 which may be a rheostat having a contact arm 64 for changing the setting and a source of electric power 66 connected in the circuit.

When a plane is getting ready to land, the constant speed motor is set in operation at its regular speed. In practice a speed 1200 R. P. M. has been found to be adequate. The operator of the plane, knowing from his instruments what the ground speed of the plane is, then closes the circuit through the core windings of the disc on the motor shaft and adjusts the amount of current by means of the variable electric resistance. When the circuit, passing through the slip rings and thence through the windings on the cores, is thus energized, a magnetic field is set up at the cores. This magnetic field passes through the space separating the ends of the cores on the malleable iron disc 50 and the malleable iron disc 54. It will be noted, of course, that the magnetic field is being rotated at the speed of the motor 42.

The path of the magnetic flux tends to be interrupted by the aluminum flange 40. This interruption is varied and modified by the presence of the perforations 61 and 63 in the flange. The effect of the magnetic or other flux or field upon the perforated flange serves as a drive connection between the motor and the wheel. It is in effect a slip drive. The effect of the drive can be varied by varying the current supplied to the coils and the wheel can be driven either faster or slower. Knowing the landing speed by use of his instruments, the operator of the plane can cause the wheels to be rotated at a corresponding speed so that they will be already rotating when the plane hits the ground.

Current supplied to the windings may be automatically varied by an air speed indicator. Air speed is not exactly the same as ground speed but the difference is generally not very great. If desired a separate set of resistances representing 10, 20, and 40 miles per hour (differences between air speed and ground speed) may be introduced into the circuit to make certain that the peripheral speed of the wheels more closely approximates landing speed.

It should be borne in mind that by reason of the fact that the flange consists of a non-magnetic metal the device cannot be said to operate as a conventional magnetic clutch. It is considered that the action may be caused by eddy currents existing between the two discs and that a variation in the effect of the eddy currents by the presence of a perforated disc moving in the field is responsible for the transfer of power from the motor to the wheel.

After the wheel has finally hit the ground it becomes advisable to exercise a braking effect upon it. In order to accomplish this, the current in the field coils of the motor may be reversed. A further braking effect may be had by means of varying the current in the core windings by manipulation of electric resistance 62. It has also been found that by shutting off the motor and retaining the circuit through the core windings in an energized condition, there remains a slip drive connection between the flange and the disc of the motor so that energy transferred to the motor from the rotating wheel can be used to change the operation of the motor from conventional motor operation to that of a generator and use may be made of the current thus generated to modify the speed of rotation of the landing wheels.

All parts are enclosed within the wheel itself which makes a substantially dust-proof, streamlined container presenting no added resistance to wind pressure. The device is light in weight and accessible by merely removing the outer disc of the wheel. Current from generators usually carried on airplanes is sufficient for all phases of operation of the device.

There has thus been provided a landing wheel drive for aircraft of a construction not heretofore employed and one which, when occasion requires, can be used alternatively as a brake, rendering unnecessary the incorporation of the conventional brake devices on the wheels.

I claim:

1. In a landing wheel for aircraft including a wheel mounting, a disc wheel provided with a rim and a tire thereon, the combination of a non-magnetic annular flange carried by the rim and extending inwardly therefrom, an electric motor stationarily secured to the wheel mounting and within the disc wheel, the axis of the motor shaft being parallel to and spaced from the wheel axis and within the inner radius of the annular flange, a disc provided with a series of circularly arranged cores carried by the shaft, the ends of said cores lying in a plane parallel to and slightly spaced from the flange, less than one half the area of the disc being in overlapping relation to the flange, windings on said cores, means for supplying current to said windings and means for controlling the rotation of said motor.

2. A landing wheel slip drive for aircraft comprising a stationary wheel mounting, a wheel on the mounting, an electric motor stationarily secured to the mounting having a rotating shaft extending therefrom in parallel spaced rotation to the wheel axis, a drive connection between the motor and the wheel comprising a member of magnetic material secured to the motor shaft having magnetic core elements thereon, a winding for each core connected in a circuit, a second member of magnetic material mounted on the shaft defining a space between itself and the cores on the first member and a perforated annular flange of non-magnetic material on the wheel extending into said space and adapted to move therethrough in a path such that some of the perforations are always positioned between the second magnetic member and the core, and a source of electric power connected in series in said circuit.

3. A landing wheel slip drive for aircraft comprising a stationary wheel mounting, a wheel rotatably mounted on the mounting, an electric motor stationarily secured to the mounting having its shaft in parallel spaced relation to the axis of rotation of the wheel, a drive connection between the motor and the wheel comprising a plate of magnetic material secured to the motor shaft having a plurality of cores thereon extending outwardly from the plate, a winding for each core connected in series with the windings for the remaining cores, a second plate of magnetic material secured to the mounting in spaced relation to the first plate and a perforated annular flange of non-magnetic material extending from the wheel into the space between the plates, the perforations in said flange having positions intermediate the plates when the portion of the flange bearing said perforations lies therebetween, an electric connection between the core windings and a circuit leading to the aircraft, an electric control element connected in series in the circuit, and a source of electric power in said circuit.

4. A landing wheel slip drive for aircraft comprising a wheel strut having a stationary wheel mounting extending therefrom and a passage for an electric connection extending through the strut and the mounting, a wheel on the mounting having a hollow inner portion between the rim and the hub, a constant speed electric motor stationarily mounted upon the stationary mounting having its shaft in parallel spaced relation to the axis of rotation of the wheel, and a bearing support for the motor shaft secured to the wheel mounting, a drive connection between the motor and the wheel comprising a plate of magnetic material secured to the motor shaft having a plurality of rows of cores thereon extending outwardly from the plate, a winding for each core connected in series with the windings for the other cores, a second imperforate plate of magnetic material mounted on the motor shaft in uniform spaced relation to the first plate and an annular, perforated flange of non-magnetic material extending from the rim of the wheel into the space between the plates, the perforations of the flange being located in a position such that sets of perforations on the flange coincide with the cores when the portion of the flange bearing the set of perforations lies adjacent the plates, a plurality of slip rings on the motor shaft connected to the core windings, a variable electric resistance element connected in series with the winding circuit and slip rings, and a source of electric power connected in series in said circuit.

5. A landing wheel slip drive for aircraft comprising a wheel strut having an axle extending therefrom and a passage for an electric connection extending through the strut and the axle, a wheel mounted on the axle having a hollow inner portion between the rim and the hub, a constant speed electric motor within said inner portion stationarily mounted upon the axle having its shaft in parallel spaced relation thereto and a bearing support for the motor shaft mounted upon the axle, a drive connection between the motor and the wheel comprising an imperforate malleable iron disc secured to the motor shaft having a plurality of concentric rows of cores thereon extending normal to the plane of the disc, a winding for each core connected in series with the remaining windings, a second malleable iron imperforate disc mounted on the motor shaft in spaced relation to the first disc and parallel thereto, and an annular, perforated, aluminum flange extending from the rim of the wheel into the space between the discs, the perforations on the flange being located in concentric rows and positioned so that sets of perforations coincide with the cores when the portion of the flange bearing a specified set of perforations lies between the discs, a plurality of slip rings on the motor shaft connected to the core windings, a variable electric resistance element connected in series with the core winding circuit and slip rings, and a source of electric power connected in series in said circuit.

6. A landing wheel control for aircraft for alternatively rotating and braking the wheels comprising a stationary wheel mounting, a wheel on the mounting, an electric motor stationarily secured to the mounting having a rotating shaft extending therefrom in parallel spaced relation to the wheel axis, a variable connection between the motor and the wheel comprising a member of magnetic material movable by the shaft having electromagnetic elements thereon connected in an electric circuit, a second member of magnetic material movable by the shaft and positioned to form a space between itself and the first magnetic member, an annular member of non-magnetic material on the wheel extending movably through the space having perforations therein located in the path of movement through the space, an electric circuit connected to the field coils of the motor including a source of electric power and a control for varying the flow of power and a second electric circuit including said electromagnetic elements, a source of electric power and a control for varying the flow of power in said electromagnetic circuit.

7. A landing wheel control for aircraft for alternatively rotating and braking the wheels comprising a stationary wheel mounting, a wheel on the mounting, an electric motor stationarily secured to the mounting having a rotating shaft extending therefrom in parallel spaced relation to the wheel axis, a variable connection between the motor and the wheel comprising a member of magnetic material movable by the shaft having electromagnetic elements thereon connected in an electric circuit, a second member of magnetic material movable by the shaft and positioned to form a space between itself and the first magnetic member, an annular member of non-magnetic material on the wheel extending movably through the space having perforations therein located in the path of movement through the space, an electric circuit connected to the field coils of the motor including a source of electric power and a control for varying and reversing the flow of power to the motor in the field coils and a second electric circuit including said electromagnetic elements, a source of electric power and a control for varying and reversing the flow of power in said electromagnetic circuit.

8. A landing wheel brake for aircraft comprising a stationary wheel mounting and a wheel thereon, a pair of cooperating brake members mounted one on the wheel and the other on the wheel mounting, one of said members comprising an electric motor, a source of power and a control in the motor circuit, a rotating shaft on the motor in parallel spaced relation to the wheel axis, an electromagnetic element driven thereby and a second magnetic element driven thereby and having a position forming a space between the magnetic elements, a second electric circuit including said electromagnetic element, a source of power and a control for varying the application of power, said other brake member comprising a perforated annular element of non-magnetic material connected to said wheel having a path of movement through said space whereby the perforations pass between the magnetic elements, said applications of electric power being adapted to arrest the movement of the second brake member relative to the first brake member.

FERENZ H. FODOR.